United States Patent [19]

Bloy et al.

[11] Patent Number: 4,853,963
[45] Date of Patent: Aug. 1, 1989

[54] DIGITAL SIGNAL PROCESSING METHOD FOR REAL-TIME PROCESSING OF NARROW BAND SIGNALS

[75] Inventors: Graham P. Bloy, St. Louis; William Ball, Chesterfield, both of Mo.

[73] Assignee: Metme Corporation, St. Louis, Mo.

[21] Appl. No.: 42,690

[22] Filed: Apr. 27, 1987

[51] Int. Cl.[4] .............................................. G10L 3/02
[52] U.S. Cl. ..................................... 381/31; 381/106
[58] Field of Search .................... 381/46–47, 381/29–32, 104–109, 72, 94, 98; 333/14; 364/724

[56] References Cited

U.S. PATENT DOCUMENTS

| | | | |
|---|---|---|---|
| 4,249,042 | 2/1981 | Orban | 381/106 |
| 4,281,295 | 7/1981 | Nishimura et al. | 333/14 |
| 4,368,435 | 1/1983 | Bloy | 381/98 |
| 4,630,304 | 12/1986 | Borth et al. | 381/47 |
| 4,661,981 | 4/1987 | Hendrickson et al. | 381/106 |
| 4,701,953 | 10/1987 | White | 381/46 |
| 4,741,039 | 4/1988 | Bloy | 381/106 |

Primary Examiner—Gary V. Harkcom
Assistant Examiner—John A. Merecki
Attorney, Agent, or Firm—Kalish & Gilster

[57] ABSTRACT

A digital signal processing method for real-time processing of narrow band signals to provide for reconstitution of dynamic amplitude and harmonics beyond the passband. The method utilizes a digital microprocessor implementing a digital algorithm upon a digitized sample of the analog signals. After processing digital-to-analog conversion circuitry may be used to reconvert the processed digital signal into a processed analog output signal for further use. The digital processing effectively provides a primary voltage compressor (PVC) function for processing signals in m different frequency sub-bands by gain factors, and a summing function for digitally summing the gain products so realized, to provide a primarily compressed signal. The processing method then further effectively provides a secondary dynamic voltage compressor (SDC) function for processing the PVC signal in within n different frequency sub-bands by digitally multiplying signals with each of such sub-bands by gain factors. The further gain products so realized are digitally summed to provide a processed digital output. An AGC gain calculation is also provided by the digital processor for providing a gain-corrected digital output which may then be supplied to D/A converter circuitry. Both fast and slow gain averaging are utilized in making the gain calculation for gain multiplication within each of m sub-bands of the PVC function. The sub-bands m and n of the PVC and SDC functions may be equal in number and have corresponding frequency domains.

17 Claims, 9 Drawing Sheets

DIGITAL SIGNAL PROCESSING METHOD FOR REAL-TIME PROCESSING OF NARROW BAND SIGNALS

CROSS-REFERENCE TO RELATED APPLICATIONS

This application is filed concurrently with co-assigned U.S. application of Graham P. Bloy for Digital Signal Processing System for Maximum Efficient Transfer of Modulated Signals, Ser. No. 07/042,669, and incorporates by reference copending U.S. application Ser. No. 06/856,832 of Graham P. Bloy and John L. Miramonti for Analog-Digital Conversion Systems, now U.S. Pat. No. 4,695,825.

BACKGROUND OF THE INVENTION

The present invention relates to signal processing of modulated signals, including audio and higher frequency signals transmitted by various modes, such as radio, television and line systems and especially for processing narrow band voice signals to increase intelligibility. The invention is particularly concerned with digital signal processing methods for permitting transfer of signals, such as voice and data, in a manner which provides maximum efficient transfer of signal energy and intelligence.

When transmitting intelligence-carrying signals, especially modulated signals (e.g., audio modulated radio frequency signals), there has always been a problem of loss or attenuation of intelligence attempted to be transferred within a given frequency band where the frequency band over which intelligence must be transferred is narrower than the range of frequencies which normally convey such intelligence. Thus, when the bandwidth or deviation of a radio frequency signal is narrow, the full spectrum of speech and other audio signals has been heretofore limited. It has, therefore, been general practice merely to transfer only a portion of those frequencies of the audio spectrum with consequent loss of intelligibility, voice character, dynamics, clarity and fidelity in general. In particular, for both line and radio frequency transmission and reception of modulated signals, a major problem has always been to obtain a high level of dynamic amplitude while retaining a usable portion of the full spectrum of speech frequencies, while keeping the bandwidth of the transmitted radio signals as narrow as possible.

In the transmission of voice signals, particularly within a narrow pass band such as 300 Hz–3 kHz used for narrow band radio transmission (e.g., AM, SSB and FM) there is often a problem of loss of dynamic amplitude and harmonic relationship upon receiving the transmitted signals. The losses result from the suppression of higher frequency order components of the signal, and particularly out-of-band harmonics which define voice character and, thus, intelligibility. Conventional compression of voice signals for radio transmission has long been utilized, but results in loss of voice dynamics with consequent loss of normal voice character and intelligence.

In Bloy U.S. Pat. Nos. 4,368,435 and 4,457,014, and in U.S. application Ser. No. 06/364,931, U.S. Pat. No. 4,741,039 of the same inventor, there are disclosed analog systems for processing of such voice signals in such a way that dynamic amplitude and harmonics behind the pass band are preserved and reconstituted during transmission to permit voice character and intelligibility to be retained in the transmitted signals, with the result that the signals may be transferred with reduced bandwidth.

Similarly, transmission of other types of signals results in their degradation as transmitted through narrow pass bands or under conditions wherein high frequency constituents may be lost during transmission, modulation, demodulation or otherwise because of the bandwidth limitations of the transmission system. For example, data may be represented by Fourier transformation and expansion into a series of sinusoidal signals having harmonics beyond the pass band capabilities. Demonstrably, narrow band transmission limits the upper frequency and rate of transmission of such signals. Therefore, it is desired also to be able to retain the intelligence which otherwise is lost during narrow band line and radio transmission.

For both analog and digital signal transmission, there are many modes of radio and line transmission where such matters of high frequency and harmonic suppression, resulting in loss of intelligibility or otherwise resulting in degradation of signal character, are of concern.

Copending U.S. application Ser. No. 856,832, U.S. Pat. No. 4,695,825 of Graham P. Bloy and of John L. Miramonti discloses an analog-digital conversion system for shortening the interval with at least one of successive timing states associated with repetitive cycles of a digital processing system, such as that herein disclosed and claimed by said analog-digital conversion system may be used for implementing the present digital signal processing methods.

SUMMARY OF THE INVENTION

A general object of the invention is to provide digital signal processing methods for permitting transfer of signals so that intelligence normally conveyed by the signals at frequencies over the normal frequency band is retained and instead conveyed by signals within such given frequency bands, thereby to transfer intelligence otherwise lost, attenuated or degraded; it being a cognate object of the present invention to provide such methods utilizing digital circuitry for digitally processing incoming signals according to a microprocessor-implemented algorithm for permitting transfer of such signals through a reduced bandwidth medium, such as by radio, line transmission or otherwise Among further objects of the invention are the provision of such methods for processing of analog signals, such as particularly voice signals for maximizing the efficiency of transfer of such various frequencies, e.g., audio frequency signals utilized for modulation of a radio frequency signal; which, as utilized for transfer of modulated signals or those utilized for modulation, result in high average modulation power being attained; and which, when utilized for the processing of voice signals, provide for their transmission with enhanced signal intelligibility and clarity while preventing loss of dynamics.

Among still other objects of the invention may be noted the provision of such methods which allow retrieval of transmitted signals with effectively high signal-to-noise ratios even under conditions of extremely high noise levels; which allow voice intelligibility to be conveyed by processing voice signals under conditions which intelligibility otherwise would be lost; and which process signals so as to achieve a reconstitution of signal components and their dynamics within a wide frequency spectrum. It is a related object of the invention to provide such methods which reconstitute signals, otherwise lost, by recovery in application of harmonics to audible levels.

It is also an object of the invention to provide such signal processing methods having utility for processing of signals, including data, other than analog and audio signals.

It is also an object of the invention to provide such methods which can be utilized in public address and other voice or music amplification systems. Thus, an object of the present invention also is the provision of such a system which may be utilized for processing of other intelligence carrying signals such as high speed tone-encoded data, teletype, facsimile, PAM, FSK and tone-activated TTY transmission, television, and other modes of data communication; which when utilized as part of a data communication link, reduced data dropout.

Finally, among still other objects of the invention may be noted the provision of such digital signal processing methods which: allow individual tailoring of harmonic response curves depending upon natural frequencies of signals to be processed; allow continuous gain control; achieve linear tracking during processing; operate to eliminate or greatly reduce third harmonic distortion; operate to reconstitute out-of-band dynamics for allowing them to be transmitted on a narrow band signal; make use of solid state integrated circuit technology; are essentially uncomplicated as well as being simple to implement when utilizing properly configured large scale integrated circuit (LSI) microprocessor devices of commercially available type, permitting such microprocessor and related circuitry to be incorporated direct into various kinds of commercial equipment, such as microphones, amplifiers, radio receivers, modulators, modulator-demodulators (modems), transmitters and tranceivers, portable or hand-held devices; and which may be incorporated into other integrated circuit devices.

It is also an object of the invention to provide such digital signal processing methods which can be adapted and modified by the user for specific mode of use; permitting a wide variety of different applications with generic flexibility; which can be implemented in a stand-alone processor for processing signals from an extrinsic source without being directly controlled by such source or other circuitry; or which alternatively may be implemented by a microprocessor which is interfaced and controlled by a further microprocessor, as by being operated as a peripheral in a microprocessor-controlled system.

It is, in general, an object of the present invention to provide methods of real-time digital processing of signals; including providing such real-time processing under microprocessor control.

Other objects and aspects of the invention will be apparent or are set forth below.

DESCRIPTION OF THE PREFERRED EMBODIMENT

A digital signal processing method of the invention is implemented by circuitry described in above referenced U.S. application Ser. No. 06/856,832, U.S. Pat. No. 4,695,825 to bring about the functionally equivalent system of FIG. 1. Such circuitry broadly includes a microprocessor which is clocked by an oscillator for implementing a digital signal processing algorithm of the present invention to process a digital input signal in accordance with such algorithm. The input signal is provided by an input 103 of the system to the microprocessor in serial binary form. The analog input signal may, for example, be any of a variety of audio and higher frequency signals transmitted by various modes, such as particularly modulated signals, and which signals may be transmitted by various modes including television, radio as well as line systems. In particular, such signals may be voice, data, combinations of sounds or other signals conventionally utilized for modulation of radio frequency signals and which, in general, are intelligence-carrying signals.

A method of digital signal processing according to the present method may be used very effectively for processing of voice signals of the type found in a narrow pass band of about 0.3–3 kHz such as utilized in narrow band radio transmission (e.g., AM, SSB and FM) to provide certain distinct advantages. When such signals are transmitted according to current analog practices within a narrow pass band, the higher frequency components are heavily attenuated, robbing the received signals of intelligibility and particularly depriving such signals of out-of-band harmonics which define voice character. The present digital processing of such signals provides reconstitution of out-of-band harmonics, enhancing the signal by restoring voice character and, accordingly, increasing intelligibility of the signals so transmitted, permitting a normal voice character to be realized by preserving and reconstituting the harmonics which otherwise would not be detected by the person receiving such a transmission. The digital signals, after being so processed by microprocessor, may be provided to a digital-to-analog (D/A) converter for conversion to analog format for future use.

Figure 1:
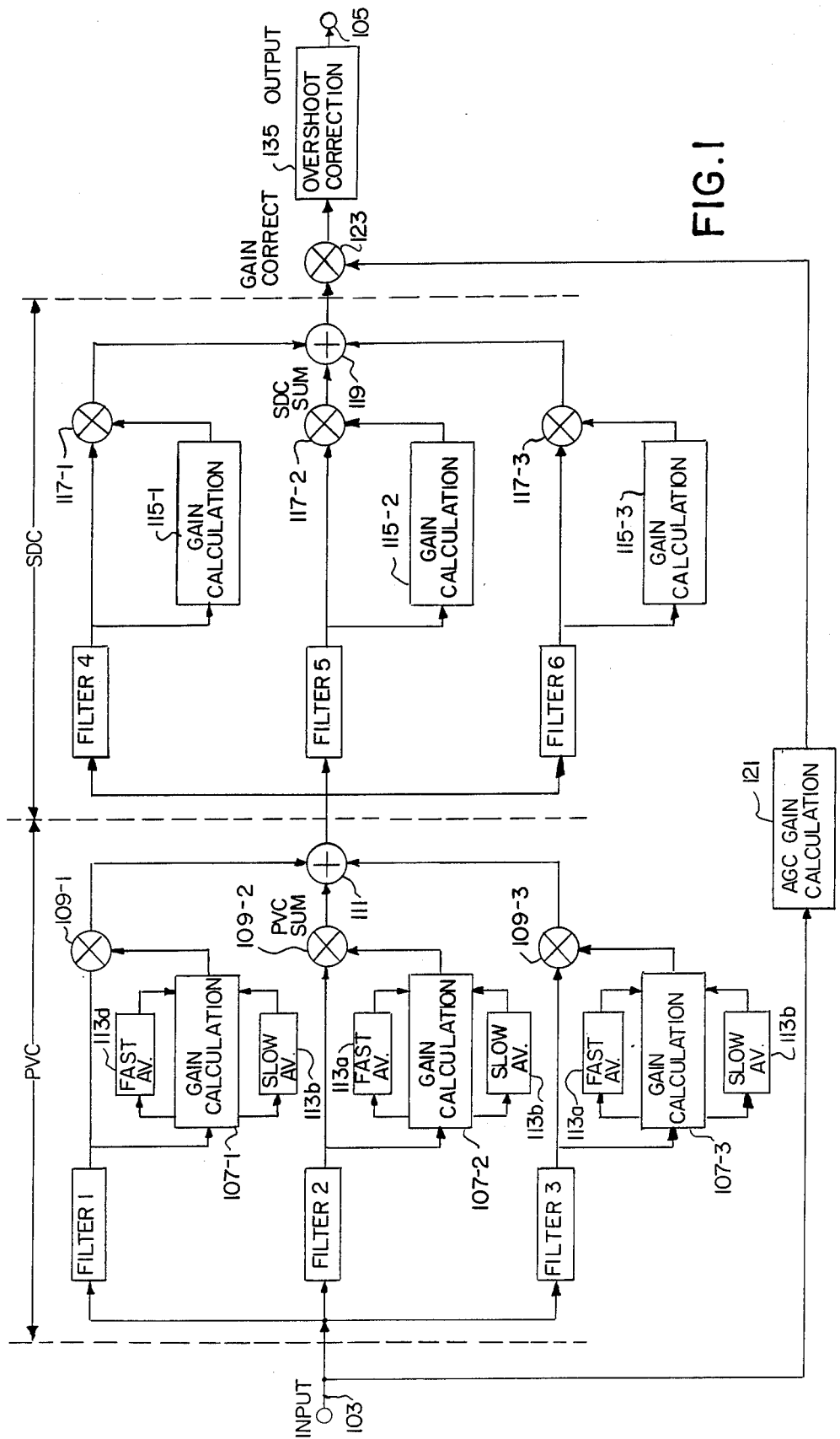
FIG. 1 is a functional equivalent diagram of a digital processing system as brought about by implementing a digital signal processing method in accordance with the present invention.

Referring to FIG. 1, the input 103 represents the high speed serial input port of the microcomputer utilized for carrying out processing algorithm much as commercially available microprocessor family types 28211 and 28212. The sampled digital data may thus be provided to the input in offset binary form for conversion by the microprocessor into 2's complement form for processing. The processed data is provided by an output 105 representing the high speed serial output port of the microprocessor.

The designations PVC and SDC represent, respectively, primary voltage compressor (PVC) and a secondary dynamic compressor (SDC) functions of the algorithm. In each such compression function are a plurality of digital filters, such as Filter 1, Filter 2 and Filter 3 of the primary voltage compressor which effectively represent the separate handling of signals within a plurality of distinct bands, in each of which gain calculations and gain products are undertaken successively. The digital filters are successively utilized, with only one at a time being active.

A gain calculation is performed upon the output of each filter, as by calculation functions designated at 107-1, 107-2 and 107-3. The output of each of such gain calculations is utilized for producing a gain product of the respective filter output, as represented functionally in FIG. 3 by multipliers 109-1, 109-2 and 109-3, being in actuality mathematically-implemented steps performed sequentially by the microprocessor as hereinbelow set forth. These products of the multiplication functions so provided are summed digitally as represented by a summer 111 which is, in actuality, a register of the microprocessor defined for this purpose and holding values defining at a given moment represents a frequency controlled primarily compressed signal.

The term "compression" is not here used in the generalized sense but rather in a hybridized context of utilizing m digital filters to divide the signal to be processed into m sub-bands in each of which gain will be varied as a function of the signal magnitude provided by the respective filter within each such sub-band. Thus, while three such filters 1, 2, 3, namely Filters 1, 2, 3, are shown by way of illustrating an embodiment of the invention, there may advantageously be utilized a much greater number of filters, such as nine or more, each defining a sub-band which is only a portion of the overall digital bandwidth.

In the example illustrated, where such bandwidth may representatively be about 0.3–3 kHz, each filter may cover approximately about one-third of the bandwidth.

Each such digital filter is realized by the microprocessor by converting the sequence of input values into a sequence of output values of desired function represented by Z-transform mathematical modeling, as applied according to known sample data theory.

Accordingly, a more apt expression for identifying the PVC function is the term "balanced sub-band bandwidth compressor" since the digital filtration technique is utilized within both PVC and SDC functions to provide m and n balanced sub-bands, respectively; and since the PVC and SDC functions together are employed to realize what is in effect bandwidth compression in the sense realized by analog circuit techniques in above-referenced Bloy U.S. Pat. No. 4,457,014.

With respect to the gain calculation functions 107-1, 107-2 and 107-3, consideration is taken of the rate at which the magnitude of the input signal changes during each cycle. If, for example, the signal being processed is changing rapidly, a gain calculation made on the basis of a single cycle average would result in greater compression than desired, and resulting in compression overshoot because of rapid increase of instantaneous gain. Similarly, gain calculation based upon a high instantaneous gain could cause clipping and waveform distortion if applied to a signal to be processed exhibiting a relatively slow change in level.

Therefore, for each such gain function, there is provided both fast and slow averaging of signal levels, as indicated for each filter by a fast gain averaging function 113a by which the instantaneous gain of the signal provided by the respective filter during a cycle is monitored and stored in a register for comparative use; and by a slow gain averaging function 113b, by which the average gain over a period of operation is monitored and stored in a register for comparison with the first average.

The gain calculation provided as indicated by the respective blocks 107-1, 107-2 and 107-3 accordingly take into consideration a fast or slow average gain for the corresponding digital Filter 1, 2 or 3 according to a desired criterion such as the divergence of the slow and average gains by greater than a preselected value. For example, the divergence criterion may be if the fast gain average voltage is greater than about 1.25 of the slow gain average voltage, in which case the gain calculation will be based upon the slow average rather than the fast (i.e., instantaneous) average in order to prevent overshoot and other problems noted above.

The SDC function is provided by Filters 4, 5, and 6, representing digital filtering for the signal summed by summing means 111, whereby to divide the so-called gain compressed signal at summer 111 into n sub-bands; again, n may be a number greater than three as illustrated.

For each of Filters 4, 5, 6, there is provided a gain calculation, here represented by functional blocks 115-1, 115-2, 115-3 by which the output of the respective filter 4, 5, or 6 is multiplied by the result of the gain calculation by multipliers 117-1, 117-2 and 117-3, as representative of mathematical functions provided by the microprocessor, all in the same way as performed during the PVC function, but without resort necessarily to a requirement for both slow and fast averaging. Instantaneous (fast) averaging may be utilized as a base for the gain calculation in the case of each of Filters 4, 5, 6.

As in the case of the PVC function, the results of the SDC function are provided by summing the gain products, as depicted by summing junction 119 which functionally represents digital summation with the sum being written to a register, providing a processed output.

The output of the SDC function so realized is then gain corrected to provide a appropriate output level by an AGC gain calculation shown by block 121, based upon the signal level at 103, the gain correction being represented functionally by a multiplier 123, and implemented by a mathematical sequence of the microprocessor.

Finally, an overshoot correction is made, if necessary, by means 125 upon the processed signal as then delivered by output 105 for further use or for serial binary-to-analog conversion. Such overshoot correction is based upon the criterion of whether the output signal magnitude exceeds a predetermined permissible maximum value beyond which clipping would otherwise occur resulting in high distortion with undesirable higher order harmonics.

According to the preferred configuration, the number m of PVC filters is the same as the number n of SDC filters, and with such filters having corresponding frequency domains. For example, if the domain of filter 2 corresponds to a pass band of 1100–1700 Hz, so also will the domain of Filter 4.

Figure 2A:
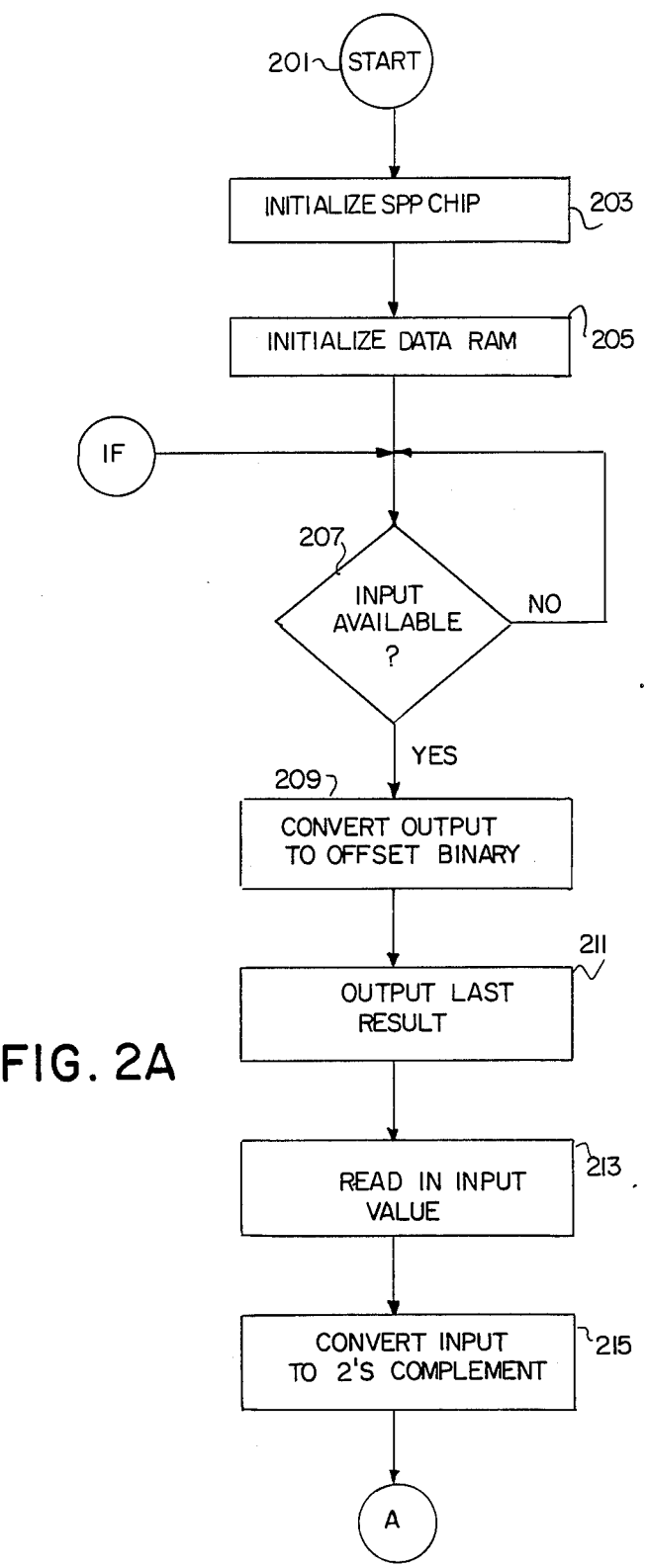
FIGS. 2A through 2H together constitute a single flow diagram illustrating the steps of a digital signal processing method in accordance with the present invention. Reference characters A, B1, B2, B3, D4, E1, E2, E3, D4, E5, E6, F1, F2, F3, F4, F5, F6, F7, and IF designate branch connections in the flow diagram.
Figure 2B:
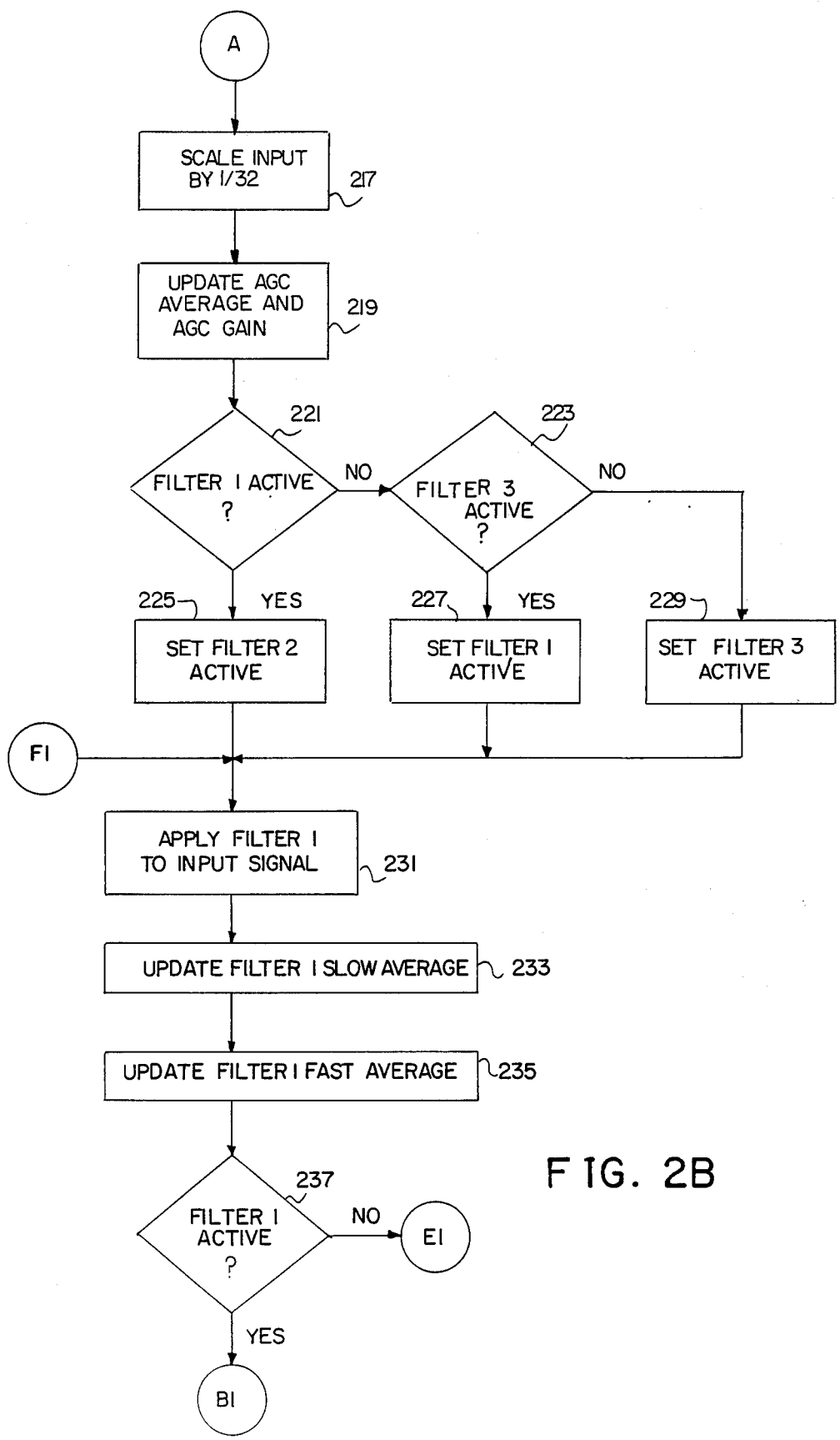
Figure 2C:
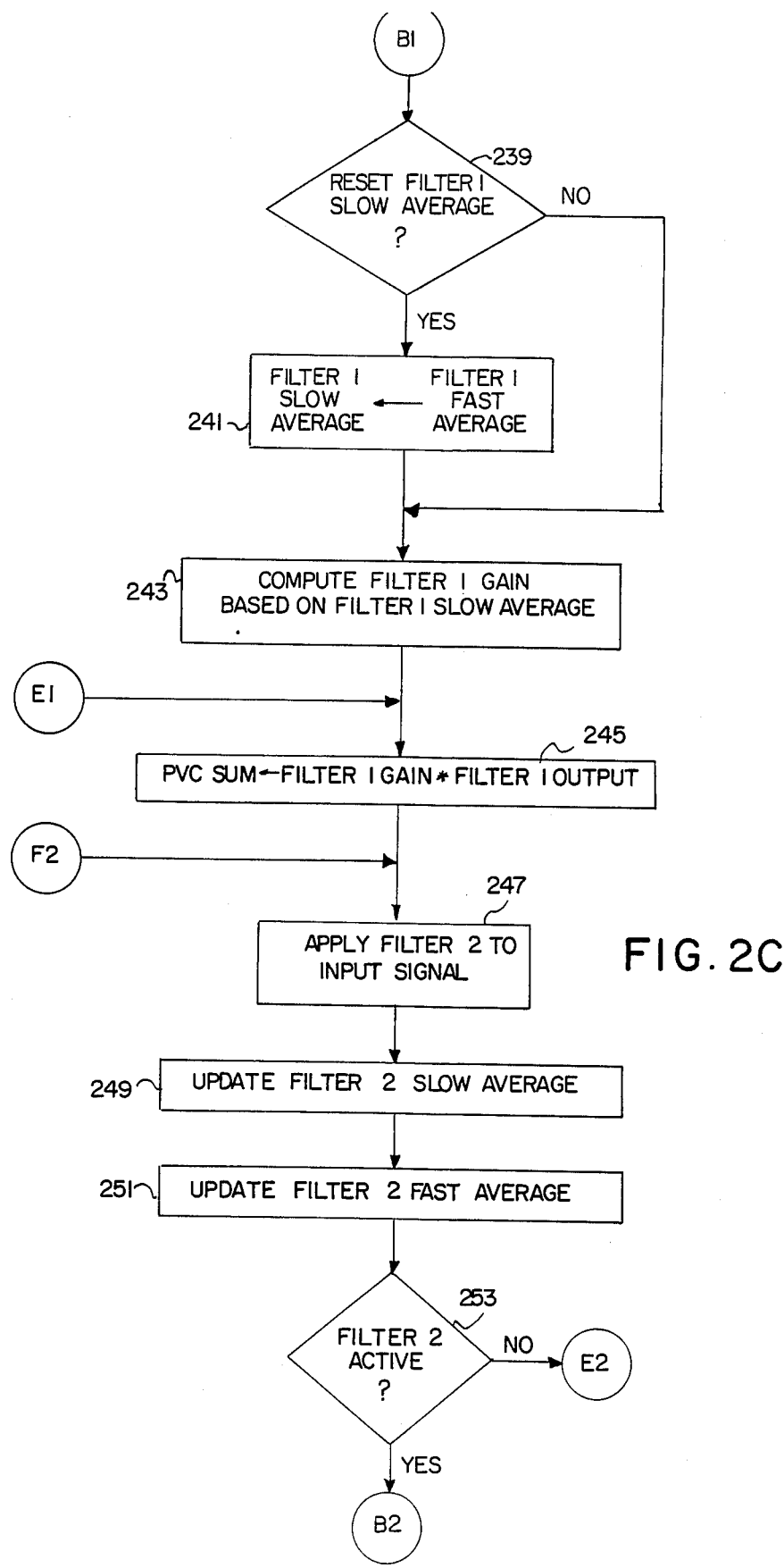
Figure 2D:
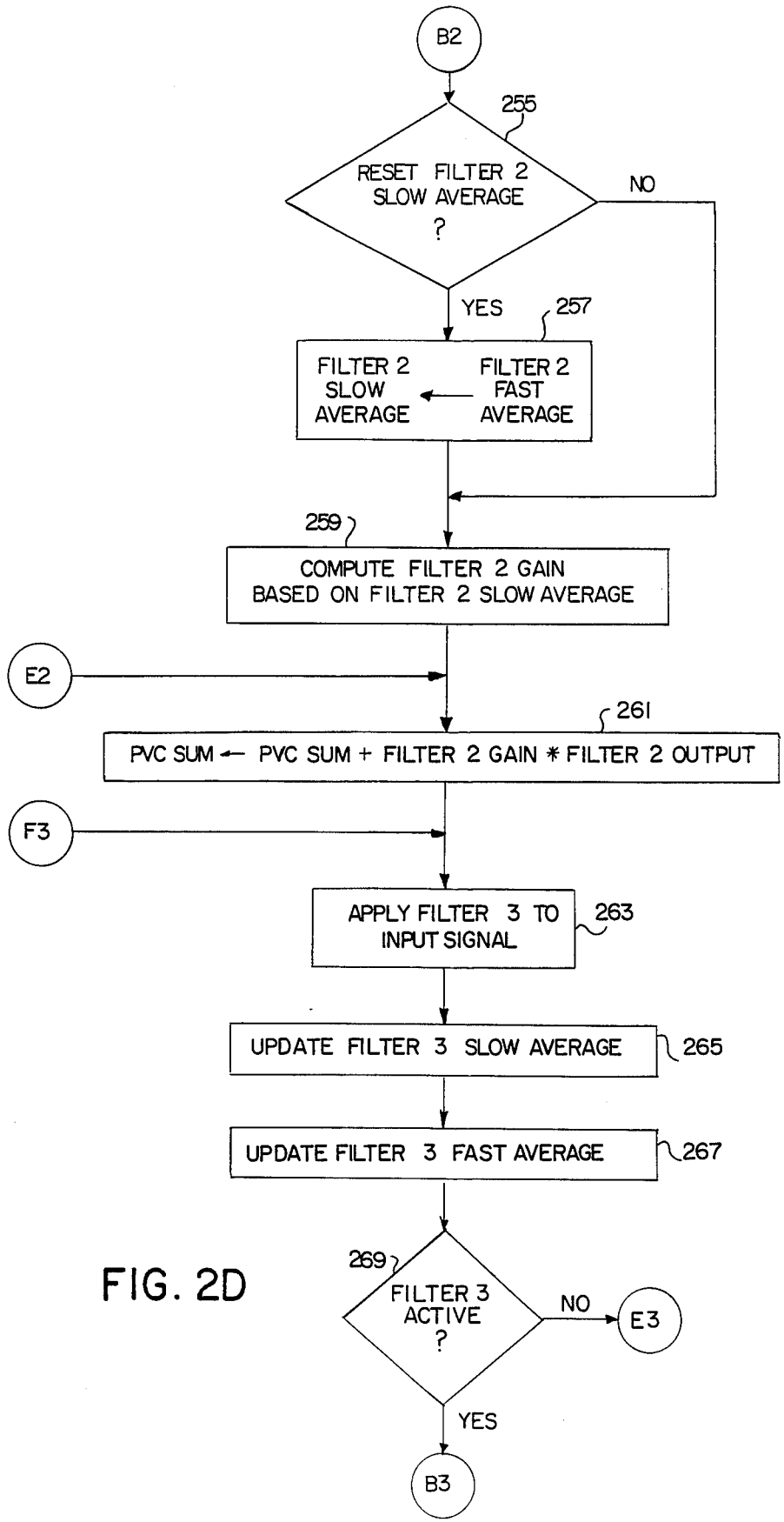
Figure 2E:
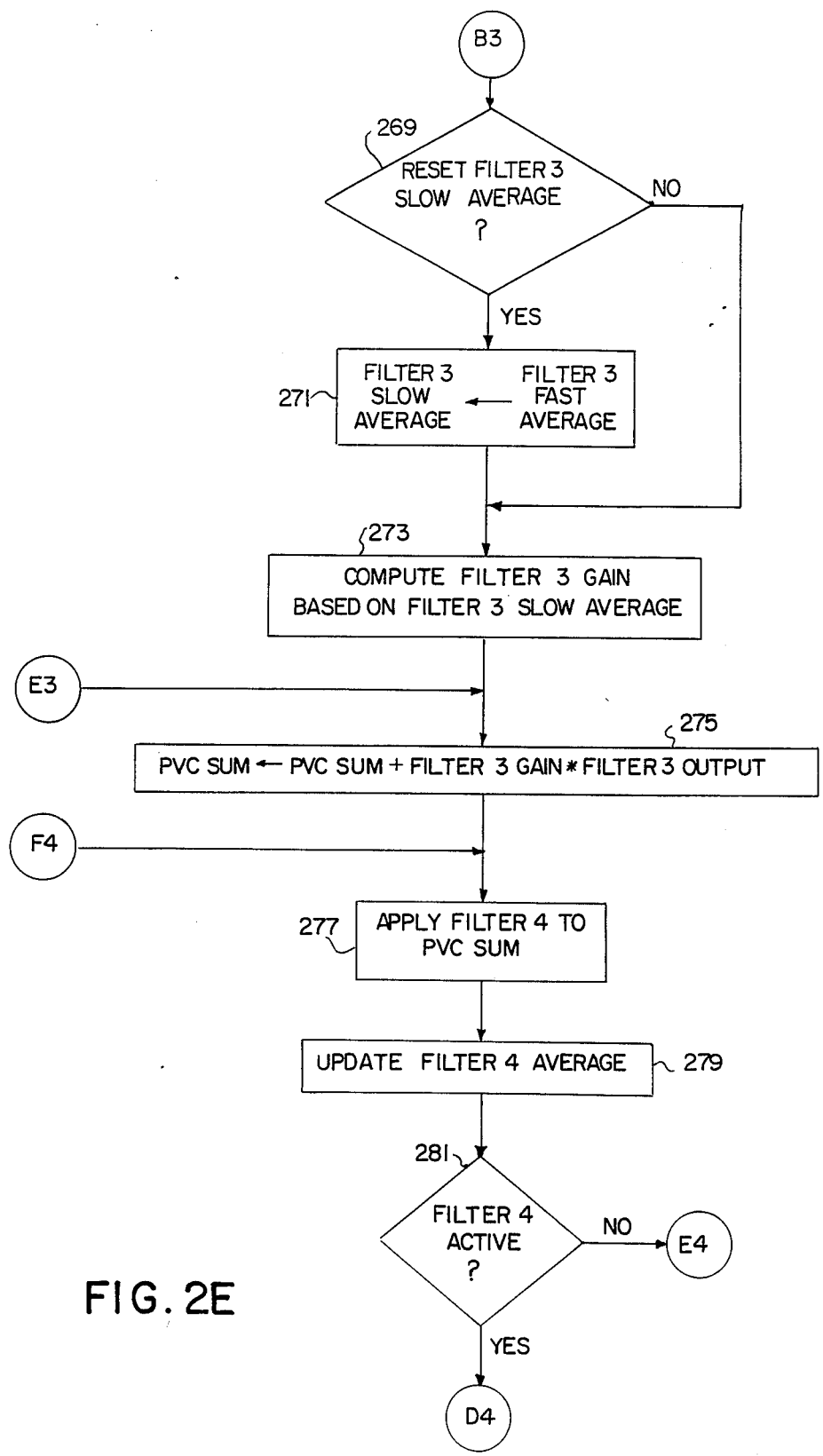
Figure 2F:
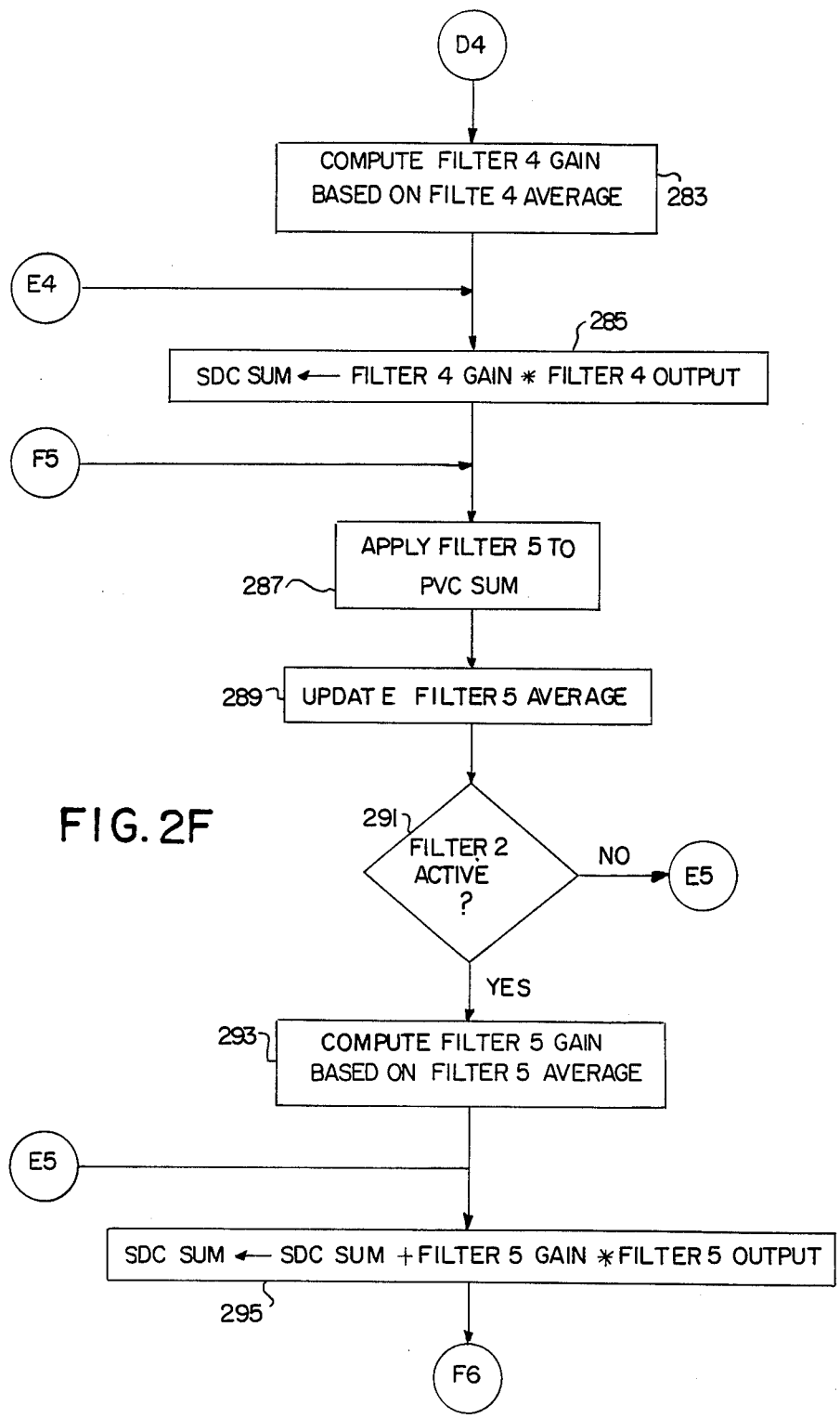

Referring now to FIGS. 2A–2H, and initially to FIG. 2A, a digital signal processing method of the invention comprises a repetitive cycle of solely microprocessor-implemented steps beginning at a start point 201, and beginning with the step 203 of initializing the microprocessor component, such as integrated circuit type 28211/28212 of an overall processing system as, for example, disclosed in above-referred U.S. application Ser. No. 856,832, followed by initializing, at step 205, a suitable data RAM (random access memory) of the microprocessor system, and configuring input/output ports and setting appropriate registers. Key IF ("Input Function") shows procedural initiation upon subsequent processing sequences.

A test 207 is made to determine if a sample input for the microprocessor is available and, if so, any output data of the microprocessor, which data may be in 2's complement form, is then converted by step 209 to offset binary form for outputting. At following step 211 the last output, so converted, is provided for further processing, as merely for example, to be converted into an analog value for subsequent use.

The microprocessor is now ready for receiving input sample data.

At step 213 a digital sample data value is read into the microprocessor. The data is converted to 2's complement interval format in step 215. Letter A represents the continuation of the drawing in FIG. 2B. There, step 217 shows scaling conversion of the 2's complement input by a scale factor of 1/32 for preventing numeric overflow in calculations to be carried out to beyond step 219.

Step 219 involves a procedure defined as updating a so-called AGC (automatic gain control) average and AGC gain according to these representative criteria:

Let $V_{agc}$ = agc average voltage, (Formula 1)

then $$V_{agc} = V_{agc} + 0.003665(abs[\text{input}] - V_{agc})$$

Let $G_{agc}$ = agc gain, then (Formula 2)

$$G_{agc} = 0.3162 + 0.6838 V_{agc},$$

where the numeric factor in the Vagc computation represents a predetermined time constant, much as 20 msec, and where all constants herein set forth presuppose a predetermined data sampling interval, such as in the range of 70–75 microsec, e.g., 73.3 microsec. These gain calculations are stored for ultimate use, and involve establishment of a suitable nominal AGC average.

Digital filters employed herein, namely Filter 1, Filter 2, Filter 3, are established by tests 221, 223 determination is made that such filters are set active in steps 225, 227, 229 as indicated. Microprocessor implemented digital processing in accordance with the present method presupposes that all filter computations are based on the formulas:

$$W_n = X_n + b_1 W_{n-1} + b_2 W_{n-2} \quad \text{(Formula 3)}$$

$$Y_n 32c(W_n + a_1 W_{n-1} + a_2 W_{n-2}) \quad \text{(Formula 4)}$$

where $X_n$ = scaled input signal; $Y_n$ = unscaled filter output, and $a_1$, $a_2$, $b_1$, $b_2$ are filter coefficients adjusted to produce an appropriate band pass, c is the filter gain factor, and the factor 32 represents the scaling factor used on the original input signal.

Filter 1 has a predefined bandpass of 300–1100 Hz. In step 231, the input signal is subjected to filtering by Filter 1. Specifically, a recursive digital filter routine is carried out wherein gain products are obtained and stored in accordance with the above criteria for signal digits $W_{n-1}$, $W_{n-2}$ to obtain values $W_n$ and $Y_n$.

Gain calculations are carried out to provide and update first a slow average filter gain, as shown in step 233, by the procedure:

Let $\overline{vs}_1$ = filter 1 slow average, then
$\overline{vs}_1 = \overline{vs}_1 + 0.018325(abs[Y_n] - \overline{vs}_1)$ (Formula 5)

where the numeric factor represents a 4 msec. time constant. Calculations are then carried out to provide and update next a fast average filter gain, as shown in step 235, by the procedure:

Let $\overline{vf}_1$ = filter 1 fast average, then
$\overline{vf}_1 = \overline{vf}_1 + 0.0733(abs[Y_n] - \overline{vf}_1)$ (Formula 6)

where the numeric factor represents a 1 millisecond time constant.

A test 237 is made next to determine if Filter 1 is active, and if so, a divergence determination is made by test 239 for purposes described next with further steps 241, 243 leading ultimately to obtaining a PVC sum, in step 245; but if Filter 1 is not still active, Key E1 shows proceeding directly to step 245.

The divergence determination in step 239 is made to ascertain if Filter 1 gain slow average value $vs_1$, will be rest to fast average value $vf_1$, if either $$\frac{\overline{vs}_1}{\overline{vf}_1} > 1.25 \quad \text{(Formula 7)}$$

or $$\frac{\overline{vf}_1}{\overline{vs}_1} > 1.25 \quad \text{(Formula 8)}$$

In either event, Filter 1 slow average is so set as shown in step 241.

Then, in step 243, Filter 1 gain is based instead on Filter 1 slow average by the formula:

if $\overline{vs}_1 = 0.0312219$ (Formula 9A)

then gain $\leq 0.088977 + 1.425051 \overline{vs}_1$ else gain $= 0.10125/(3.0 \overline{vs}_1)$ (Formula 9B)

The gain value includes a rescaling of the output by a factor of 1/32. The division operation is represented within the procedure by a series of straight line segments approximating the reciprocal curve.

Step 245 obtains a PVC sum based upon the product of Filter 1 gain and Filter 1 output. This sum is stored in register as represented in FIG. 1 at 109-1.

Similar procedures are implemented for FIGS. 2 and 3. In step 247, digital Filter 2, having a bandpass of 1100–1900 Hz, is applied to the input signal. For steps 249, 251, Filter 2 slow average and fast average are updated, in the same manner as for Filter 1, the slow average being updated according to the formula $\overline{vs}_2 = \overline{vs}_2 + 0.3665(abs[Y_n] - \overline{vs}_2)$ (Formula 10)

where the numeric factor represents a 2 millisecond time constant, the fast average being updated according to $\overline{vf}_2 = \overline{vf}_2 + 0.091625(abs[Y_n] - \overline{vf}_2)$ (Formula 11)

where the numeric factor represents a time constant of 800 microsec.

At 253 a test is made to determine if Filter 2 is active. If so, key B2 shows continuation to a next test 255, being again a divergence determination to reset Filter 2 to the slow average according to the above criteria, as shown in step 257. Whether filter 2 is reset or not, the procedure advances to step 259 in which filter gain is computed based on the slow average, using formulas 9A, 9B as described above for step 243. Key E2 saves proceeding direct from decision 253 if determined in the negative. In step 261, a new PVC sum is obtained based upon the current PVC sum as summed with the product of Filter 2 gain and Filter 2 output and the sum stored in register further for further use, as symbolized in FIG. 1 at 109-2.

Filter 3 is applied to the input signal, as represented in step 263. Slow and fast filter average for filter 3 is updated in step 265 according to $$\overline{vs}_3 = \overline{vs}_3 + 0.048867(abs[Y_n]\overline{vs}_3) \qquad \text{(Formula 12)}$$

where the numeric factor represents a 1500 microsecond time constant. Fast average for filter 3 is updated in step 267 according to $$\overline{vf}_3 = \overline{vf}_3 + 0.104714(abs[Y_n] - \overline{vf}_3) \qquad \text{(Formula 13)}$$

where the numeric factor represents a 700 microsec. time constant.

A Test 269 is made for whether Filter 3 is or is not active, with processing continuing according to keys B3 or E3. In step 271, determination is made whether or not to reset Filter 3 fast average to the slow average according to the above-described divergence criteria, with resetting if so occuring in step 273. In either event, Filter 3 gain, based on slow average, is computed in step 273 based upon formulas 9A, 9B. In step 275, a new PVC sum is obtained based upon the prior PVC sum as summed with the product of Filter 3 output and Filter 3 gain. This new PVC sum being stored in register for further processing. This procedure corresponds to summer 111 in FIG. 1.

In making the filter store average/fast divergence tests, allowance is provided for possible variations of the input signal whereby to avoid either overshooting, such as might otherwise occur if rapid increase of instantaneous gain were permitted, or clipping or wave distorting, such as might result if using fast filter gain for filtering a slowly changing input signal. In this regard, it is preferred to take each filter fast average over 1 cycle but to take filter slow average over a minimum of 2 cycles and preferably 3 cycles. The preselected divergence criteria, namely $$\frac{\overline{vs}}{\overline{vf}} = 1.25 \qquad \text{(Formula 14)}$$

avoid the above-noted degradation involving overshooting, clipping or wave distortion.

Referring again to FIG. 1, secondary dynamic compressor (SDC) processing, in the present hybridized sense, is next implemented. Therefore, referring now to FIG. 1F, processing by Filter 4, ensues with step 277 showing Filter 4 having a bandpass of 300–1100 Hz, applied to the new PVC sum. Filter 4 average is updated in step 279. Updating of Filter 4 is according to the formula $$\overline{v}_4 = \overline{v}_4 + 0.018325(abs[pvc\ sum] - \overline{v}_4) \qquad \text{(Formula 15)}$$

where the numeric factor represents a time constant of 4 milliseconds. It is here emphasized that the frequency domains of Filters 4, 5, 6 correspond respectively to those of Filters 1, 2, 3, but the PVC procedure has sufficiently smoothed the signal during processing that only single-cycle averaging now may be used for Filters 4, 5, 6 during the SDC procedures.

A test 281 is made to determine whether or not filter 4 is active with Keys D4, E4 showing continuation of the processing accordingly. Referring to FIG. 1F, step 283 shows the procedure of calculating filter 4 gain based on Filter 4 average, using formulas 9A, 9B. In step 285, an initialized SDC sum is obtained by taking the product of Filter 4 gain and Filter 4 output.

Filter 5, having a bandpass of 1100–1900 Hz, is next applied to the PVC sum, as shown by step 287. Then, in step 289, Filter 5 average is updated according to $$\overline{v}_5 = \overline{v}_5 + 0.054749(abs[pvc\ sum] - \overline{v}_5) \qquad \text{(Formula 16)}$$

where the numeric factor represents a time constant of 1339 microseconds.

A test 291 is made to determine if Filter 2 is active, and if so, Filter 5 gain is computed in step using formulas 9A, 9B. Key E5 merely shows continuation if the test result is negative, and the procedure continues to step 293 only if the decision is affirmative. Step 295 follows, in which the SDC sum is updated by adding to the prior SDC sum. The product of Filter 5 gain and Filter 5 output Key E6 shows continuation to FIG. 2G.

Figure 2G:
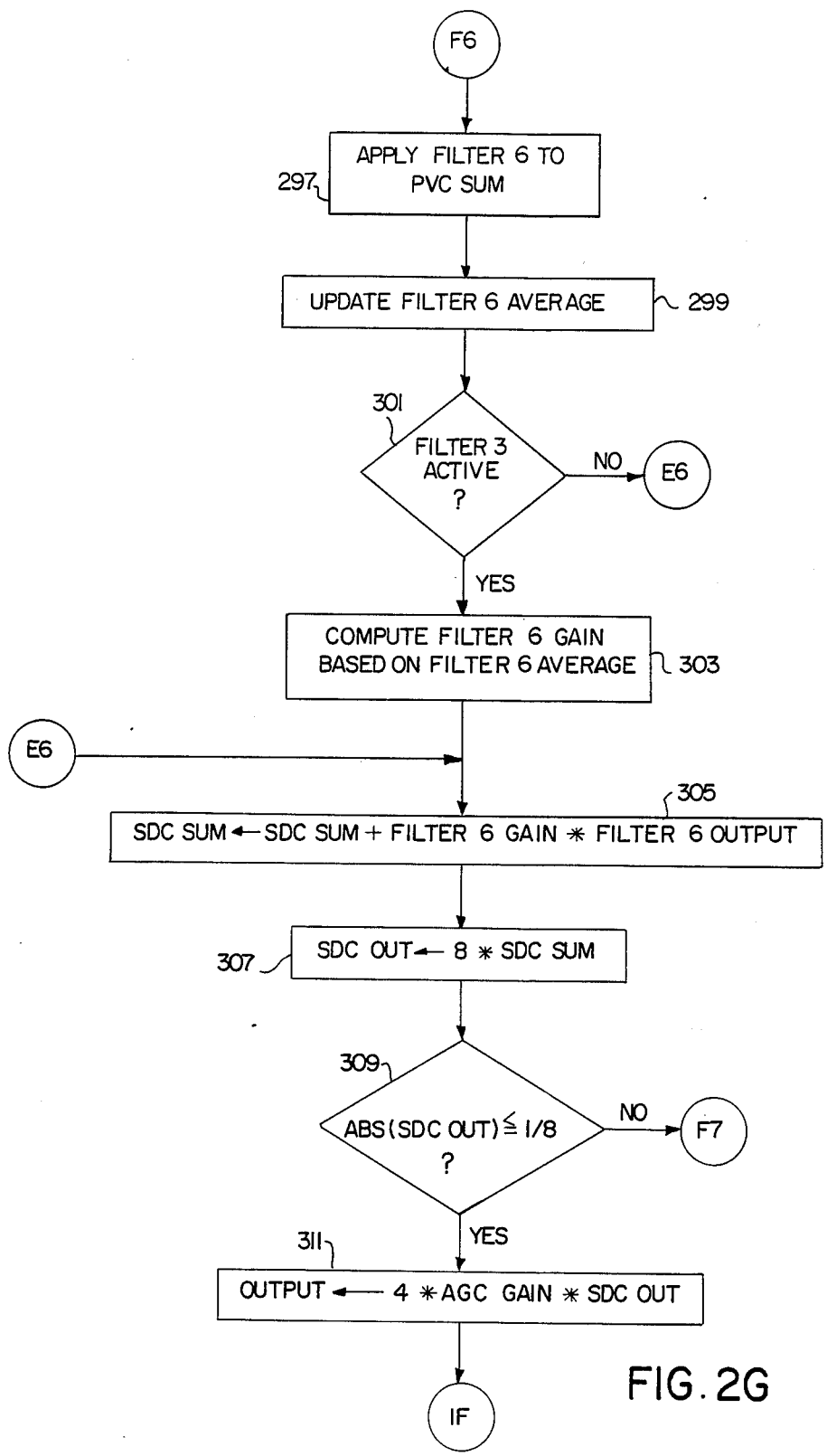
Figure 2H:
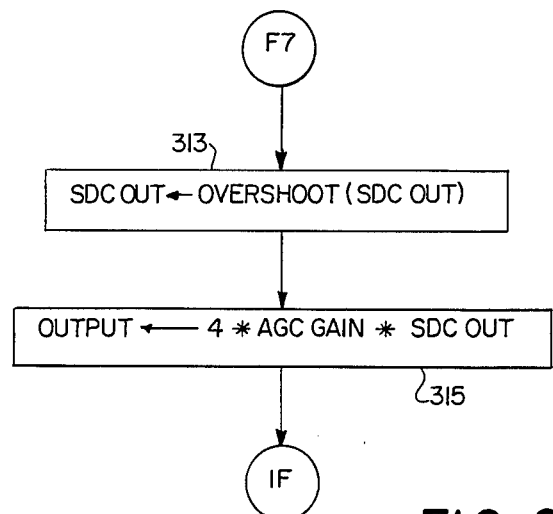

Referring to FIG. 2G, filter 6 is applied in step 297 to the current PVC sum, said filter having a bandpass of 1900–2700 Hz. In following step 299, Filter 4 average is updated according to $$\overline{v}_6 = \overline{v}_6 + 0.054749(abs(pvc\ sum) - \overline{v}_6) \qquad \text{(Formula 17)}$$

where the numeric factor represents a time constant of 1339 microseconds. As shown at test 301, there is made a determination of whether or not Filter 3 is active, and, if so, Filter 6 gain is computed in step 303 based on Filter 6 average in accordance with formulas 9A, 9B. Key E6 shows proceeding direct without such step 303 if Filter 3 is not active.

The current SDC sum is then summed with the product of Filter 6 gain and Filter 6 output to provide a final and complete SDC sum output, as shown in step 305. In following step 307, this new updated SDC sum is multiplied by a factor of 8 for upward scaling in step 307, as contracted with step 217, since the SDC procedure is gain-increasing in nature. Use of a floating point processor for the processing could obviate the need for such scaling, the present processing having been assumed to be carried out by use of fixed point processor. Under these circumstances, test 309 is made upon the SDC output to determine whether or not its absolute value is less than or equal to ⅛. If not, procedure follows as shown by Key F7 or FIG. 2H, but if so, step 311 is taken. In this step, then the product of AGC, gain SDC output level and a multiplication factor of 4 are obtained. The resultant signal is used a system output, and the entire processing sequence is re-initiated with input function (Key IF). However, if the partially unscaled signal exceeds the valve of ⅛ in test 309, then system gain has caused signal overshoot. Any such overshoot is smoothly corrected in step 313 FIG. 2H by an appropriate reduction of the signal level according to $$v_{out} = 0.34375 - 0.373178(1.0 - abs(v_{in}))^4 \quad \text{(Formula 18)}$$

to obtain a reduced SDC output signal level which, in step 315, is multiplied by the AGC gain and a further factor of 4. Input function (Key IF) follows, wherein a new input sample is considered in test 207 and the processing sequence is repeated cyclically for successive input samples. Accordingly, it is seen that the present invention provides a method of solely microprocessor-implemented digital signal processing comprising the steps of providing an input sample of a digital signal to be processed; then processing the sample within a plurality m of different frequency bands to provide a primary voltage compression (PVC) function by:

(1) submitting the sample to digital filtering within each of the m sub-bands, (2) multiplying the digitally filtered sample within each of the sub-bands by a respective gain factor to provide for each sub-band a gain product; and (3) digitally summing the gain products so obtained to provide a primary sum constituing a primarily compressed sample. The method further entails the steps of processing the primarily compressed sample within a plurality n of different frequency bands to provide a secondary voltage compression (SVC) function by:

(1) submitting the primary sum to digital filtering within each of the n sub-bands, (2) multiplying the digitally filtered sample within each of the sub-bands by a respective gain factor to provide for each sub-band a gain product; and (3) digitally summing the gain products so obtained to provide a secondary sum constituting a secondarily compressed sample; followed by multiplying the secondary sum by a gain control factor to provide a gain-corrected digital output signal. These steps are continuously repeated for successive input samples to provide successive processing cycles. In effecting this procedure the respective gain calculation for each of the m sub-bands is carried out by monitoring the output of the respective filters for providing both fast and slow average gain calculations for each of the filters in step 2.2 to provide fast and slow factors for each of the m sub-bands, making a divergence determination by mathematically comparing the fast and slow factors to determine if a predetermined divergence criterion is exceeded, and multiplying the output of the respective filter output by the slow factor if the divergence criterion is exceeded.

By use of appropriate timing circuitry, as disclosed in above-identified application Ser. No. 06/856,832, the different phases of processing, namely digitizing, digital processing, and analog reconversion, can be carried out by overlapped (interleaved) sequencing. Thus, a first analog sample is digitized and provided to the microprocessor for digital processing. During such processing, a subsequent sample is held and digitized. The processed signal is then clocked out from the microprocessor for analog reconversion. During such reconversion, a third sample is digitized, and so forth.

In view of the foregoing, it will be seen that the several objects of the invention and other advantages are achieved by the new methods which have been described.

Although the foregoing includes the description of the best mode of the embodiments contemplated for carrying out the invention, various modifications are contemplated.

As various modifications could be made in the methods herein described and illustrated without departing from the scope of the invention, it is intended that all matter contained in the foregoing description or shown in the accompanying drawings shall be interpreted as illustrative rather than limiting.

What is claimed is:

1. A method of solely microprocessor-implemented digital signal processing comprising the steps of
    (1) providing an input sample of a digital signal to be processed;
    (2) processing the sample within a plurality m of different frequency sub-bands to provide a primary voltage compression (PVC) function by
        (2.1) submitting the sample to digital filtering within each of the m sub-bands,
        (2.2) multiplying the digitally filtered sample within each of the sub-bands by a respective gain factor to provide for each sub-band a gain product;
        (2.3) digitally summing the gain products so obtained to provide a primary sum constituting a primarily compressed sample;
    (3) processing the primarily compressed sample within a plurality n of different frequency sub-bands to provide a secondary voltage compression (SVC) function by
        (3.1) submitting the primary sum to digital filtering within each of the n sub-bands,
        (3.2) multiplying the digitally filtered sample within each of the n sub-bands by a respective gain factor to provide for each sub-band a gain product;
        (3.3) digitally summing the gain products so obtained to provide a secondary sum constituting a secondarily compressed sample;
    (4) multiplying the secondary sum by a gain control factor to provide a gain-corrected digital output signal;
    (5) continuously repeating steps (2) through (4) for successive input samples to provide successive processing cycles.

2. A method of digital signal processing according to claim 1 wherein m and n are each at least 3.

3. A method of digital signal processing according to claim 2 wherein m equals n.

4. A method of digital signal processing according to claim 3 wherein the gain factors in steps (2.2) and (3.2) are determined by making a respective gain calculation for each digital filter as a function of the output of the respective filter.

5. A method of digital signal processing according to claim 4 wherein the respective gain calculation for each of the m sub-bands is carried out by
    (6.1) monitoring the output of the respective filters for providing both fast and slow average gain calculations for each of the filters in step (2.2) to provide fast and slow factors for each of the m sub-bands,
    (6.2) making a divergence determination by mathematically comparing the fast and slow factors to determine if a predetermined divergence criterion is exceeded, and
    (6.3) multiplying the output of the respective filter by the slow factor if the divergence criterion is exceeded.

6. A method of digital signal processing according to claim 5 further comprising basing said fast average gain calculation upon an instantaneous output level of the respective filter and basing said slow average gain calculation upon the output level of the respective filter over a plurality of successive processing cycles.

7. A method of digital signal processing according to claim 5 wherein the divergence criterion is a ratio of fast average factor to slow average factor of about 1.25.

8. A method of digital signal processing according to claim 5 wherein step (4) further comprises comparing the secondary sum with a predetermined output value and multiplying the secondary sum by a second gain control factor to prevent the gain-corrected digital output signal from overshooting said predetermined output value.

9. A method of digital signal processing according to claim 2 wherein the gain control factor is calculated as a predetermined function of the input sample level.

10. A method of digital signal processing according to claim 1 wherein said digital filtering in steps (2.1) and (3.1) is carried out according to the formulas:

$$W_n = X_n + b_1 W_{n-1} + b_2 W_{n-2}$$

$$Y_n = 32c(W_n + a_1 W_{n-1} + a_2 W_{n-2})$$

where $W_n$ represents the respective digital signal sample value having signal digits $W_{n-1}$, $W_{n-2}$; $X_n$=scaled input sample; $Y_n$=unscaled filter output, and $a_1$, $a_2$, $b_1$, $b_2$ are filter coefficients adjusted to produce an appropriate band pass for the respective filter, c is the gain factor for the respective filter, and 32 represents a scaling factor used for the input sample.

11. A method of digital signal processing according to claim 1 wherein the input sample is a sample of digital-form human voice signals, and said method further comprises repetitively sampling said digital-form voice signals and carrying out steps (1) through (4) for each of successive samples to provide real-time processing of said voice signals.

12. A method of digital signal processing according to claim 11 wherein each sample of digital-form human voice signals is obtained by repeated sampling of analog real-time voice signals, to provide successive analog samples thereof, and by subsequent analog-to-digital conversion of the analog samples.

13. A method of digital signal processing according to claim 11 wherein the voice signals are within the range of about 0.3–3 kHz.

14. A method of solely microprocessor-implemented digital signal processing comprising the steps of
(1) providing an input sample of a digital signal to be processed;
(2) processing the sample within a plurality m of different frequency sub-bands, where m is an integer of at least 3, to provide a primary voltage compression (PVC) function by
 (2.1) submitting the sample to digital filtering within each of the m sub-bands,
 (2.2) multiplying the digitally filter sample within each of the sub-bands by a respective gain factor to provide for each sub-band a gain product wherein said gain factor in this step (2.2) is determined by making a respective gain calculation for each digital filter as a function of the output of the respective filter, and
 (2.3) digitally summing the gain products so obtained to provide a primary sum constituting a primarily compressed sample;
(3) processing the primarily compressed sample within a plurality n of different frequency sub-bands, where n is an integer of at least 3, to provide a secondary voltage compression (SVC) function by
 (3.1) submitting the primary sum to digital filtering within each of the n sub-bands, and
 (3.2) multiplying the digital filter sample within each of the n sub-bands by a respective gain factor to provide for each sub-band a gain product wherein said gain factor in this step (3.2) is determined by making a respective gain calculation for each digital filter as a function of the output of the respective filter, and wherein the respective gain calculation for each of the m sub-bands is carrier out by
  (3.2.1) monitoring the output of the respective filters for providing both fast and slow average gain calculations for each of the filters in step (2.2) to provide fast and slow factors for each of the m sub-bands,
  (3.2.2) making a divergence determination by mathematically comparing the fast and slow factors to determine if a predetermined divergence criterion is exceeded, and
  (3.2.3) multiplying the output of the respective filter by the slow factor if the divergence criterion is exceeded;
 (3.3) digitally summing the gain products so obtained to provide a secondary sum constituting a secondarily compressed sample;
(4) multiplying the secondary sum by a gain control factor to provide a gain-corrected digital output signal; and
(5) continuously repeating steps (2) through (4) for successive input samples to provide successive processing cycles.

15. A method of digital signal processing according to claim 14 wherein the input sample is a sample of digital-form human voice signals, and said method further comprises repetitively sampling of said digital-form voice signals and carrying out steps (1) through (4) for each of successive samples to provide real-time processing of said voice signals.

16. A method of digital signal processing according to claim 15 wherein each sample of digital-form human voice signals is obtained by repeated sampling of analog real-time voice signals, to provide successive analog samples thereof, and by subsequent analog-to-digital conversion of the analog samples.

17. A method of digital signal processing according to claim 15 wherein the voice signals are within the range of about 0.3–3 kHz.

* * * * *